United States Patent
Ying et al.

(10) Patent No.: US 12,535,117 B2
(45) Date of Patent: Jan. 27, 2026

(54) LOW-RESISTANCE LOCKABLE GAS SPRING

(71) Applicant: Yili Industrial U.S. Co., Ltd., Grand Rapids, MI (US)

(72) Inventors: Duanzhong Ying, Ningbo (CN); Libin Wang, Ningbo (CN)

(73) Assignee: Yili Industrial U.S. Co., Ltd., Grand Rapids, MI (US)

( * ) Notice: Subject to any disclaimer, the term of this patent is extended or adjusted under 35 U.S.C. 154(b) by 430 days.

(21) Appl. No.: 18/100,353

(22) Filed: Jan. 23, 2023

(65) Prior Publication Data

US 2023/0279918 A1    Sep. 7, 2023

(51) Int. Cl.
*F16F 9/02*    (2006.01)
*F16F 9/36*    (2006.01)
*F16J 15/3268*    (2016.01)

(52) U.S. Cl.
CPC ............ *F16F 9/0209* (2013.01); *F16F 9/362* (2013.01); *F16J 15/3268* (2013.01)

(58) Field of Classification Search
USPC .................. 188/297, 304, 313, 300
See application file for complete search history.

(56) References Cited

U.S. PATENT DOCUMENTS

| | | | | |
|---|---|---|---|---|
| 3,954,256 A | * | 5/1976 | Keijzer | B60G 17/04 267/64.21 |
| 8,899,560 B2 | * | 12/2014 | Allen | F16F 9/44 188/313 |
| 2002/0175035 A1 | * | 11/2002 | Achenbach | F16F 9/084 188/315 |
| 2003/0019698 A1 | * | 1/2003 | Dohrmann | F16F 9/063 188/269 |
| 2010/0244340 A1 | * | 9/2010 | Wootten | B60G 15/12 188/313 |
| 2014/0291087 A1 | * | 10/2014 | Bianchi | F16F 9/22 188/297 |
| 2016/0052590 A1 | * | 2/2016 | Yablon | F16F 9/44 188/297 |
| 2019/0178329 A1 | * | 6/2019 | Dumitru | B60G 17/08 |

FOREIGN PATENT DOCUMENTS

| | | | | |
|---|---|---|---|---|
| CN | 107701639 A | * | 2/2018 | ............ F16F 9/02 |
| DE | 2519372 A1 | * | 11/1976 | ............ F16F 9/064 |
| JP | 6523849 B2 | * | 6/2019 | |
| WO | WO-2022271132 | * | 12/2022 | ............ F16F 9/0272 |

* cited by examiner

*Primary Examiner* — Devon C Kramer
(74) *Attorney, Agent, or Firm* — Gunther J. Evanina; BUTZEL LONG

(57) ABSTRACT

A gas spring having concentric outer and inner tubes that define a first chamber between the tubes is provided with a floating piston sealingly and slidingly radially disposed against an inner surface of the inner tube and axially disposed between a valve piston and a rear cap.

6 Claims, 1 Drawing Sheet

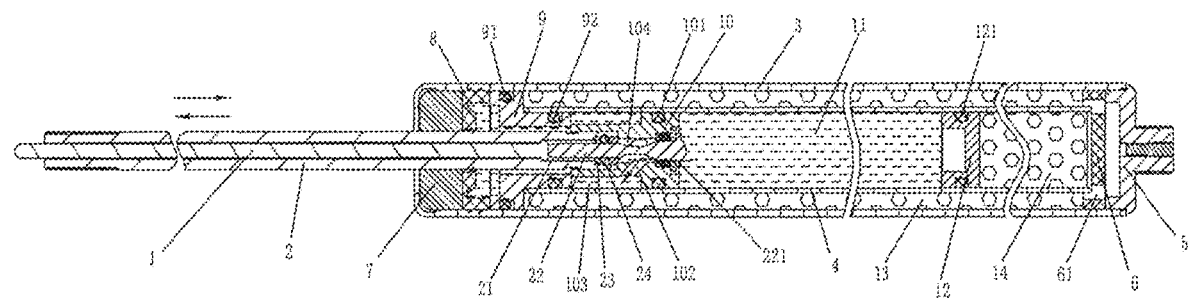

LOW-RESISTANCE LOCKABLE GAS SPRING

CROSS-REFERENCE TO RELATED APPLICATION

This application claims priority under 35 USC § 119(a) to Chinese Patent Application No. 2022204703561, filed on Mar. 2, 2022 which is incorporated herein by reference in its entirety.

FIELD OF THE DISCLOSURE

The invention is related to the technical field of gas spring, and in particular to a low resistance lockable gas spring.

BACKGROUND OF THE DISCLOSURE

A gas spring is an industrial part that has the function of supporting, buffering, braking, height and angle adjustment, etc. It consists of several components: pressure cylinder/tube, piston rod, piston, guide bushing, filling, control element inside and outside the cylinder/tube, and joint/connector. The operating principle is to fill the inert liquid or liquid and gas mix into the pressure cylinder/tube. The pressure inside the chamber/tube is several or over ten times higher than the air pressure outside. The pressure difference generated by the cross-sectional area of the piston rod smaller than the cross-sectional area of the piston will move the piston rod up and down.

The floating piston in the dual cylinder/tubes gas spring is generally located between the outer tube and the inner tube, the roughness on the outer surface of the inner tube is normally pretty large, to generate the larger friction force during the motion of the floating piston, which makes the floating piston easy to be worn out, and the life time of the floating piston is short. Moreover, it will impact the gas springs sealing performance to have the possible leakage of liquid and gas.

SUMMARY OF THE DISCLOSURE

This disclosure is targeting to resolve the problem mentioned above, to provide a low resistance lockable gas spring that makes the floating piston less friction force when motion, resulting in the floating piston not easy to be worn off, improving the lifetime of the floating piston, and the sealing performance is better with less possibility of leakage.

A low resistance lockable gas spring is assembled with an outer tube and an inner tube. The inner tube is located inside the outer tube. One end of the outer tube is welded to the rear cap, and one end of the inner tube is assembled with a sleeve aligned with the rear cap. The other end of the outer tube is assembled with a guide bushing. A piston rod is slidingly connected inside the guide bushing, and a top rod is slidingly connected inside the piston rod. One end of the piston rod is located inside the inner tube and is assembled with a slide. A valve needle is slidingly connected inside the slide with the top rod. A valve body piston is slidingly sealed to the inner tube on a second end of the piston rod. There is a floating piston inside the inner tube and located between the piston and the guide bushing. A first chamber is between the inner tube and the outer tube, a second chamber is inside the inner tube and between the floating piston and the guide bushing, and a flow channel connects the first chamber and the second chamber inside the guide bushing. A lower chamber is inside the inner tube and between the piston and the floating piston. The lower chamber inside the outer tube and located in the inner tube has a spacer at the bottom of the inner tube away from the guide bushing. The inner tube has an upper chamber between the spacer and the valve piston. The valve piston has a valve chamber and an overflow hole for connecting the upper chamber with the valve chamber. The end of the valve needle away from the top rod extends through the valve chamber and into the lower chamber, and the end of the valve needle away from the top rod has a flow stopper aligned to the valve piston.

The inner tube is located inside the outer tube, one end of the outer tube is assembled with a rear cap, and one end of the inner tube is assembled with a sleeve aligned to the rear cap. Another end of the outer tube is assembled with a guide bushing, and a piston rod is slidingly connected inside the guide bushing. A top rod is slidingly connected inside the piston rod. One end of the piston rod is located inside the inner tube and is assembled with a slide. A valve needle is slidingly connected inside the slide with the top rod, and a valve body piston is slidingly sealed to the inner tube on an end of the piston rod. The inner tube is assembled with a valve body piston. There is a floating piston inside the inner tube and located between the piston and the guide bushing. A first chamber is between the inner tube and the outer tube, a second chamber is inside the inner tube and located between the floating piston and the guide bushing, and a flow channel connects the first chamber and the second chamber inside the guide bushing. The first chamber and the second chamber are filled with gas. A lower chamber is inside the inner tube and located between the valve piston and the floating piston. The inner tube is assembled with a lower chamber between the valve piston and the floating piston, and the outer tube is assembled with a spacer at the bottom of the inner tube away from the guide bushing. The inner tube is assembled with an upper chamber between the spacer and the valve piston, and the valve piston is assembled with a valve chamber. The valve chamber, the upper chamber and the lower chamber are filled with oil. The valve piston is assembled with an overflow hole for connecting the upper chamber to the valve chamber. The bottom of the valve needle away from the top rod extends through the valve chamber and into the lower chamber. The valve needle is assembled with a flow stopper at the bottom of the valve needle away from the top rod, and the flow stopper is assembled at the bottom of the valve piston. When the gas spring is not engaged by external force, the flow stopper is placed on the valve piston, preventing the oil in the lower chamber from entering the valve chamber.

The operation of the piston rod in the gas spring has three statuses, the first one is the compression status, wherein the external force presses the top rod, the top rod moves to push the valve needle to open, which makes the flow stopper on the valve needle off the valve body piston, thus making the upper chamber, valve chamber and lower chamber connected. Then the external force continues to press the piston rod, when the external force is greater than the piston rod support force, the piston rod continues to press down, as the piston rod into the inner tube, thus making the oil in the lower cavity enter the valve cavity after being squeezed and flow into the upper cavity through the overflow hole, and at the same time the oil in the lower cavity pushes the floating piston down, and the gas in the first and second cavities is compressed.

The second is the extension status, wherein the external force presses the top rod, the top rod moves to push the valve pin to open, making the flow stopper on the valve pin off the valve body piston, so that the upper cavity, valve cavity and lower cavity are connected. When the external force is less than the piston rod support force, the piston rod extends outward, so that the oil in the upper cavity is squeezed and enters the valve cavity and flows into the lower cavity, and the piston rod extends the inner tube, meanwhile, the gas pressure in the second cavity pushes the floating piston upward.

The third is the locking status, wherein the external force on the top rod is withdrawn, the valve needle is different due to the internal and external pressure and the external pressure is less than the internal pressure, thus generating a thrust to close the valve needle, the flow blocker on the valve needle will be against the valve body piston to isolate the valve cavity and the lower cavity. At this time the oil circuit is closed, the oil is harder to compress, the internal pressure is unchanged, the piston rod can stay in any position, and the locking force of the piston rod is high and stable. When the whole gas spring is in operation, because the floating piston is located inside the inner tube, the surface roughness of the inner diameter of the inner tube is low, and the friction force on the floating piston when it slides is small, which makes the floating piston not easy to wear, thus improving the service life of the floating piston. The structure has fewer sealing points, the seal life is reliable and high, and it is not easy to have gas or oil leakage; and the structure only has the inner tube as the oil storage cavity. The oil volume of the inner tube is less, and a larger overflow hole can be designed to achieve high spring speed.

The guide bushing and the spacer can be assembled with an oil seal around the piston rod. The oil seal is assembled between the guide bushing and the spacer around the piston rod, and the oil seal can perform better sealing function to ensure the stability in use and improve the lifetime.

The slide can be assembled with a positioning sleeve aligned to the valve needle, and the positioning bushing is assembled with a fourth seal. The side of the slide away from the top rod is assembled with a positioning bushing aligned to the valve needle, and the positioning bushing is assembled with a fourth seal ring. Both the positioning bushing and the fourth seal ring are assembled and aligned to the valve needle, which on the one hand can play a certain guiding and positioning role for the motion of the valve needle, and on the other hand can also perform better sealing function to prevent the oil leakage.

The floating piston can be assembled with a first seal on and aligned with the inner tube.

The second seal can be assembled with spacers aligned to the outer tube, and a third seal assembled with the spacer aligned to the inner tube.

A fifth seal can be assembled on the outer surface of valve body piston aligned to the inner tube.

A low resistance lockable gas spring of this disclosure can have the following advantages: the structure of the invention is simple and easy to use, which can make the floating piston bear less friction when sliding/motion, making the floating piston uneasy to be worn off, improving the lifetime of the floating piston, and the sealing performance is better, and prevent the gas or oil leakage.

BRIEF DESCRIPTION OF THE DRAWINGS

FIG. 1 is a longitudinal cross-sectional view of a gas spring in accordance with this disclosure.

DETAILED DESCRIPTION

A technical explanation of the disclosed gas spring is further stated below by example, in accordance with the drawing.

As shown in FIG. 1, a low resistance lockable gas spring includes an outer tube 3 and an inner tube 4. The inner tube 4 is located inside the outer tube 3. One end of the outer tube 3 is assembled with a rear cap 5, one end of the inner tube 4 is assembled with a guide sleeve 6 aligned to the rear cap 5, the other end of the outer tube 3 is assembled with a guide bushing 7. A piston rod 2 is slidingly connected inside the guide bushing 7, and a top rod 1 is slidingly connected inside the piston rod 2. One end of the piston rod 2 is located inside the inner tube 4. The bottom of the piston rod 2 is located inside the inner tube 4 and has a slide 21. The slide 21 has a valve needle 22 slidingly connected to the top rod 1, the bottom of the piston rod 2 has a valve body piston 10 slidingly sealed to the inner tube 4. The inner tube 4 has a floating piston 12 slidingly sealed between the valve body piston 10 and the guide bushing 6. A first cavity 13 is between the inner tube 4 and the outer tube 3. The inner tube 4 has a second cavity 13 between the floating piston 12 and the guide bushing 6. The inner tube 4 and the outer tube 3 are separated by a first chamber 13, and the inner tube 4 has a second chamber 14 between the floating piston 12 and the guide bushing 6. The guide bushing 6 is assembled with the flow channel 61 for connecting the first chamber 13 and the second chamber 14. The first chamber 13 and the second chamber 14 are filled with gas. The inner tube 4 has a lower chamber 11 inside and between the valve piston 10 and the floating piston 12. The outer tube 3 has a spacer 9 inside and at the bottom of the inner tube 4 away from the guide bushing 6. The valve cavity 104 is assembled inside the valve piston 10, and the valve cavity 104. The upper cavity 103 and the lower cavity 11 are filled with oil. When the entire gas spring is not subjected to external force, the flow stopper 221 will be placed against the opening of the valve cavity 104 on the valve piston 10, so that the oil in the lower cavity 11 cannot enter the valve cavity 104.

The operation of the piston rod 2 in the whole gas spring has three statuses. The first status is the compression status, wherein the external force presses the top rod 1, the top rod 1 moves to push the valve needle 22 to open, which makes the flow stopper 221 on the valve needle 22 off the valve body piston 10, thus making the upper chamber 103, valve chamber 104 and lower chamber 11 connected. Then the external force continues to press the piston rod 2, when the external force is greater than the piston rod 2 support force, the piston rod 2 continues to press down, as the piston rod 2 enters the inner tube 4, thus making the oil in the lower cavity 11 enter the valve cavity 104 after being squeezed and flow into the upper cavity 103 through the overflow hole 102, and at the same time the oil in the lower cavity 11 pushes the floating piston 12 down, and the gas in the first cavity 13 and the second cavity 14 is compressed.

The second status is the extension status, wherein the external force presses the top rod 1, the top rod 1 moves to push the valve needle 22 open, making the flow stopper 221 on the valve needle 22 off the valve body piston 10, so that the upper cavity, valve cavity and lower cavity 11 are connected. When the external force is less than the support force of the piston rod 2, the piston rod 2 extends outward, so that the oil in the upper cavity is squeezed and enters the valve cavity and flows into the lower cavity 11, and the piston rod 2 extends the inner tube 4, at the same time, the gas pressure in the second cavity 14 pushes the floating piston 12 upward.

The third status is the locking status, wherein the external force on the top rod 1 is withdrawn, the valve needle 22 is different due to the internal and external pressure and the external pressure is less than the internal pressure, thus generating a thrust to close the valve needle 22, the flow blocker 221 on the valve needle 22 will be against the valve body piston 10 to isolate the valve cavity and the lower cavity 11. At this time the oil circuit is closed, the oil is harder to compress, the internal pressure is unchanged, the piston rod 2 can stay in any position, and the locking force of the piston rod 2 is high and stable. When the whole gas spring is in operation, because the floating piston 12 is located inside the inner tube 4, the surface roughness of the inner diameter of the inner tube 4 is low, and the friction force on the floating piston 12 when it slides is small, which makes the floating piston 12 not easy to wear, thus improving the service life of the floating piston 12. The structure has fewer sealing points, the seal life is reliable and high, and it is not easy to have gas or oil leakage; and the structure only has the inner tube 4 as the oil storage cavity. The oil volume of the inner tube 4 is less, and a larger overflow hole 102 can be designed to achieve high spring speed.

Due to the use of floating piston 12, separating the gas-liquid cavity, compared with a single cylinder, it is able to have a larger gas cavity. Since the pressure difference between the gas-liquid cavity is small and equal at rest, the life of this gas spring is higher, while the gas cavity is large, even if the floating piston 12 seal wears and leaks a small amount of oil, it does not affect the use. The floating piston 12 has only one sealing surface, the inner diameter surface accuracy of the inner tube 4 is easier to improve, the surface will not be scratched, and the quality is easier to guarantee; since the gas cavity is large, the piston rod 2 has strong compression ability and quick rebound.

The oil seal 8 is assembled between the guide bushing 7 and the spacer 9 around the piston rod 2, and the oil seal 8 can play a better sealing effect to ensure the stability in use and improve the service life.

There is a positioning sleeve 23 on the side of the slide 21 away from the top bar 1 aligned to the valve needle 22, and there is a fourth seal ring 24 inside the positioning sleeve 23. Both the positioning sleeve 23 and the fourth seal ring 24 are set aligned to the valve needle 22, which can play a certain guiding and positioning role for the movement of the valve needle 22 on the one hand, and also play a better sealing effect to prevent oil leakage on the other hand.

A first seal 121 is assembled on the floating piston 12 aligned to the inner tube 4, a second seal 91 is assembled on the spacer 9 aligned to the outer tube 3, and a third seal 92 is assembled on said spacer 9 aligned to the inner tube 4. A fifth seal 101 is assembled on the outer surface of the valve body piston 10 aligned to the inner tube 4, thus enabling a better sealing effect.

Please recognize that the example is intended to illustrate the invention only and is not intended to limit the scope or function of the invention. Furthermore, it should be understood that after reading what is taught herein, the professional in this field may make various alterations or modifications to the invention, which in equivalent form likewise fall within the scope defined by the claims appended to this application.

PARTS LIST

1—top rod
2—piston rod
3—outer tube,
4—inner tube,
5—rear bottom,
6—guide bushing
7—guide bushing
8—oil seal
9—spacer
10—valve piston
11 lower chamber
12—floating piston
13—first chamber
14—second chamber
21—slide
22—valve needle
23—positioning bushing
24—fourth seal
61—flow channel
91—second seal
92—third seal
101—fifth seal
102—overflow hole
103—upper chamber
104—valve chamber
121—first seal
221—flow stopper

The invention claimed is:
1. A low resistance lockable gas spring, comprising:
an outer tube having a first end and an opposite second end;
an inner tube having a first end and an opposite second end, the inner tube located inside the outer tube;
a guide bushing located inside the outer tube at the first end of the outer tube and having a through-bore axially aligned with the outer tube;
a piston rod extending through and slidably movable along the through-bore of the guide bushing, the piston rod having a first end located outwardly from the first end of the outer tube and a second end located inside the inner tube, the piston rod including an axial passageway;
a valve piston movable along the inner tube and sealed to the inner tube, the valve piston fixed to the second end of the piston rod and having a valve chamber;
a top rod positioned in and movable along the axial passageway of the piston rod, the top rod having a first end extending outwardly of the first end of the piston rod and a second opposite end located inside the inner tube;
a slide fixed to the second end of the inner tube;
a floating piston located inside the inner tube between the second end of the piston rod and the second end of the outer tube;
a first chamber defined in an annular space between the outer tube and the inner tube;
a second chamber inside the inner tube and between the floating piston and the second end of the inner tube;
a flow channel providing a fluid conduit connecting the first chamber and the second chamber;
a third chamber inside the inner tube and between the valve piston and the floating piston;
an overflow hole connecting the third chamber and the valve chamber;
a spacer fixed at the first end of the inner tube adjacent to the guide bushing;
a fourth chamber located radially between a recessed section of the valve piston and the inner tube;

a valve needle movable inside the slide and fixed to the second end of the top rod, the valve needle extending though the valve chamber; and a flow stopper fixed to an end of the valve needle opposite the end fixed to the top rod, the flow stopper positioned and configured to selectively block and open the overflow hole depending on external force applied to the piston rod.

2. The gas spring of claim 1, further comprising an oil seal around the piston rod between the guide bushing and the spacer.

3. The gas spring of claim 1, further comprising a bushing radially disposed between the valve needle and the valve piston.

4. The gas spring of claim 1, further comprising a first seal ring between the floating piston and the inner tube.

5. The gas spring of claim 1, further comprising a second seal ring between the spacer and the outer tube, and a third seal ring between the spacer and the inner tube.

6. The gas spring of claim 3, further comprising a fourth seal ring between the valve needle and the valve piston.

\* \* \* \* \*